March 10, 1942.  H. F. HOWARD ET AL  2,275,763
PROCESS OF MAKING VALVES
Filed Oct. 7, 1938

Inventors
Harold F. Howard &
William Richards
By Blackmor, Spencer & Flint
Attorneys Patented Mar. 10, 1942

2,275,763

UNITED STATES PATENT OFFICE 2,275,763

PROCESS OF MAKING VALVES

Harold F. Howard and William Richards, Flint, Mich., assignors to General Motors Corporation, Detroit, Mich., a corporation of Delaware Application October 7, 1938, Serial No. 233,832

3 Claims. (Cl. 219—3)

This invention relates to valves and consists in the manufacture by a new process of poppet valves such as are used in internal combustion engines. The process is also useful in the manufacture of articles other than valves having, as in the case of valves, a stem and a suitably shaped head.

One object of the novel process is economy in the manufacture of such articles.

Another object resides in the formation of valves by heating only that part of a rod which is to be deformed to make the head.

Among other objects may be mentioned the relatively brief time required for making the valve, and the absence of scale which ordinarily forms and which must be removed.

Other advantages will be understood from the following description.

On the drawing accompanying this description:

Figure 1:
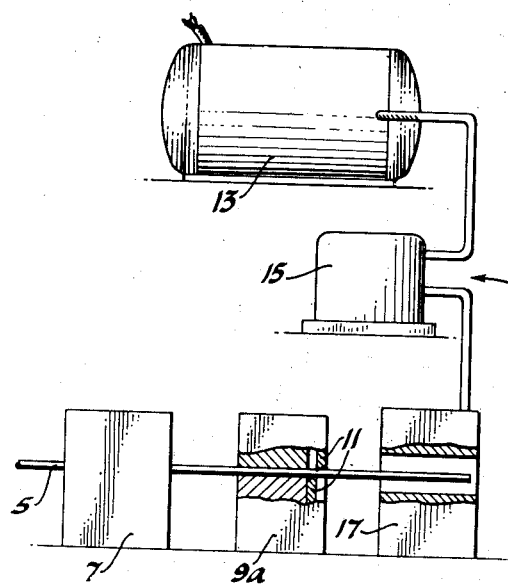
Figure 1 is a diagrammatic view showing a first series of steps of the process.

Referring to Figure 1 numeral 5 represents a rod or the like of steel from which is to be formed a valve having a stem and a seat engaging head. The valve stock may be in the form of a straight rod or it may be in the form of a coil. When the valve is made from coiled stock the rod is first passed through any preferred straightening mechanism such as is diagrammatically shown and designated by a numeral 7. This mechanism serves to straighten the rod so that it may serve as the stem of the valve. From the straightening machine 7 the rod is passed to a machine having two parts, a part 9 adapted to heat the end of the rod which is to be formed into a head, and a part 9a which is adapted to cut a length of rod to provide a valve stem of the desired length. In accordance with the invention the shearing members of part 9a are shown and designated by numeral 11. They are to be operated by any convenient means and preferably cut the rod simultaneously with the heating of the end in part 9. Part 9 includes as a source of electric current a high frequency generator 13, a high frequency transformer 15 and an induction heater unit 17 within which the high frequency current heats the end portion only of the rod by the well-known process of magnetic induction. This end portion is heated to a temperature of approximately 1800° to 2000° F. The apparatus is constructed and designed to effect this degree of heating in approximately one second of time. In consequence of this rapid heating no formation of scale occurs. The molecular disturbance which causes the heating of the end of the rod is confined to the end and the heat is not transmitted appreciably in an axial direction through the rod. The heated end is then to be shaped to form the valve head. For this purpose there is used any convenient upsetting machine represented on the drawing by numeral 19. It has a plurality of vertical passages 21, 23 and 25 within which the stem on the valve is successively placed. At the upper end of these passages are dies 27, 29 and 31 having recesses progressively to form the heated head forming end. With the aid of the plunger 33 the die 27 first forms the heated end to a shape somewhat as shown at 35. Die 29 then transforms the head to a shape 37 and die 31 produces the final shape 39. It will be understood that although three steps in forming the head are suggested, a smaller number may be sufficient in some instances or, if preferred or found desirable, a greater number of steps may be used. The valve so formed is free from scale and requires only the conventional machining steps.

The process of making the valve requires but little time, the metal structure is highly satisfactory for the strength required of the poppet valve. The simplicity of the operation is such that economy in manufacture is assured.

Figure 2:
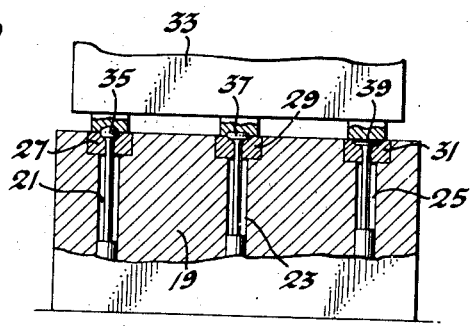
Figure 2 is a similar view showing subsequent steps.
Figures 3, 4:
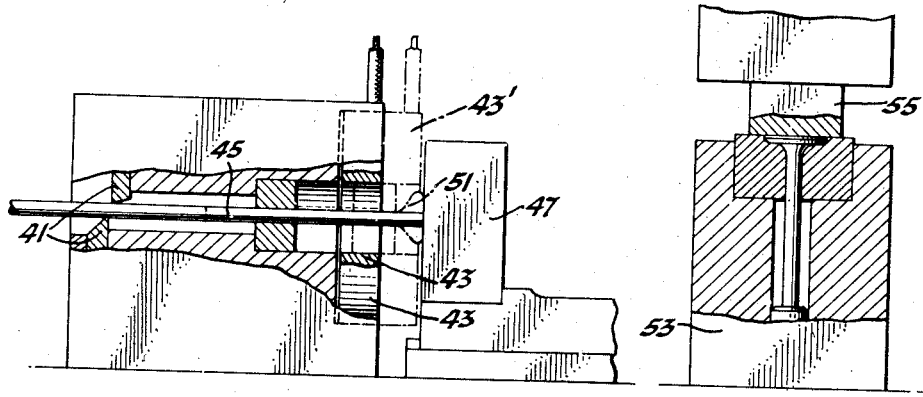
Figures 3 and 4 are similar views of a modified process, Figure 3 showing a first series of steps and Figure 4 showing a subsequent step.

In Figure 2 is shown a modified form wherein the first step of flattening the heated end is taken simultaneously with the heating process. In this form of the invention the rod may be straightened as before explained. It is then pressed forward to the heating and shearing machine. In this form the induction heating unit 43 is mounted at 43' to slide toward and away from an anvil 47. It is the end of the rod in contact with the anvil which is heated. The pressure forcing the rod toward the anvil causes it to advance as it is heated and flattened. To continue the heating action during this flattening an operating mechanism of any convenient kind serves to move the heating unit forwardly with the rod until it approaches the anvil 47. It is then made to withdraw to provide the necessary clearance for the enlarging head forming end. After this heating and first head forming process the mechanism operating the shearing elements at 41 cuts the rod to make the desired length of stem. The partly formed valve is then removed and the heating unit is returned to its original position. The valve is then given one or more forging steps to shape the head. For this purpose an upsetting machine is employed, such a machine being designated by numeral 53 associated with a plunger 55. In view of the fact that the head is partly formed during the process of heating but one or two steps will be needed instead of three as in the form shown by Figure 1.

We claim:

1. The continuous process of making one-piece poppet valves or the like from rod stock, comprising: cutting said stock into sections each having an extent equal to the desired length of the valve stem plus an integral blanking portion of sufficient mass for formation into the valve head, exclusively subjecting said blanking portion of each rod section to a sharply-defined alternating magnetic field of sufficiently high frequency and intensity to effect localized magnetically-induced heating of the entire mass of said blanking portion to forging temperature within a time period so short as to preclude appreciable heating of the adjoining valve stem portion by conduction, and immediately upsetting said blanking portion of the rod section into valve-head form before appreciable reduction of its heat through conduction to the adjoining stem-constituting portion of the rod.

2. The continuous process of making one-piece poppet valves or the like from ferrous rod stock, comprising: exclusively subjecting the leading terminal portion of said ferrous rod stock to an alternating magnetic field of sufficiently high frequency and intensity to effect immediate local heating thereof to forging heat by hysteresis and eddy-current phenomena, working said thus-heated terminal rod portion against an upsetting die by the application of axial pressure to the adjoining portion of said rod stock before appreciable transmission of heat from said terminal portion to said adjoining portion by conduction, and severing said adjoining rod portion from the rod stock at a distance from said heated terminal portion corresponding to the length of the valve stem desired.

3. In the process of making poppet valves or the like the steps of heating the end of a rod in a heating unit by high frequency magnetic induction, pushing the rod into contact with an anvil during the process of heating to flatten its end, moving the heating unit toward the anvil during the process of heating the end of the rod and then retracting the heating unit to provide clearance adjacent the anvil for the spreading of the heated end.

HAROLD F. HOWARD.
WILLIAM RICHARDS.